Dec. 31, 1963 P. P. DEAN 3,115,791
TWO-SPEED POWER TRANSMISSION
Filed July 3, 1962
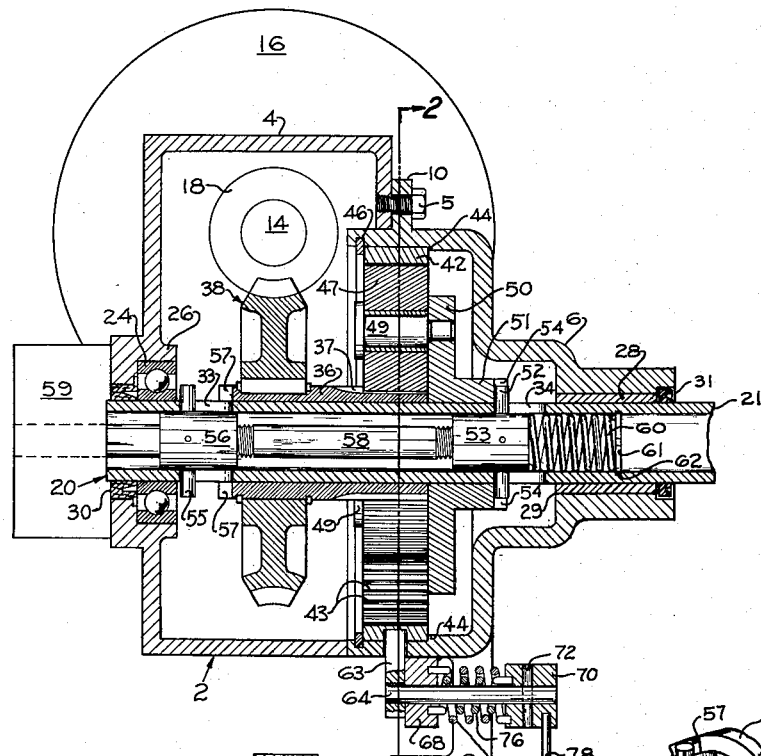
FIG. 1
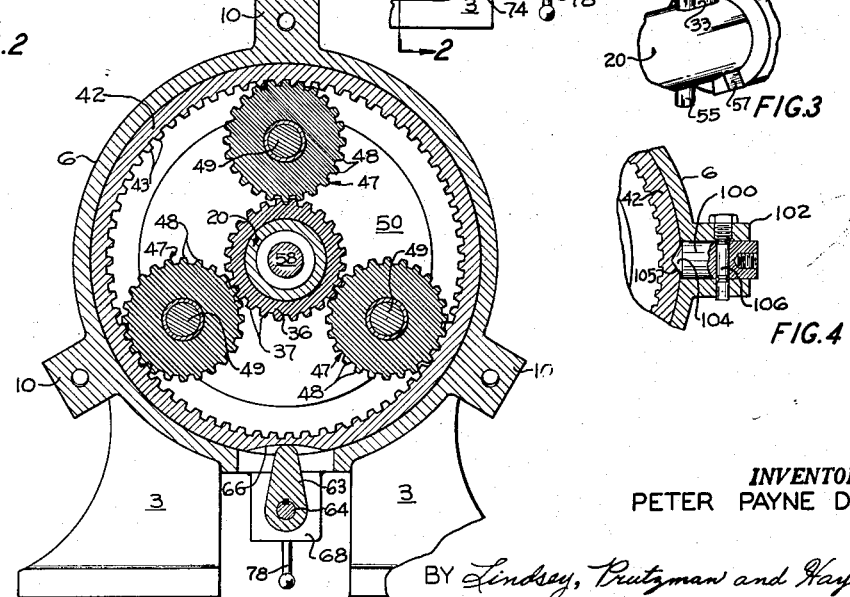
FIG. 2
FIG. 3
FIG. 4
INVENTOR.
PETER PAYNE DEAN
BY Lindsey, Prutzman and Hayes
ATTORNEYS United States Patent Office 3,115,791
Patented Dec. 31, 1963

3,115,791
TWO-SPEED POWER TRANSMISSION
Peter Payne Dean, Barkhamsted, Conn.
Filed July 3, 1962, Ser. No. 207,293
3 Claims. (Cl. 74—750)

This invention generally relates to power transmissions and is concerned more particularly with a novel two-speed power transmission utilizing a planetary-type gear arrangement for gear reduction.

One of the objects of the present invention is the provision of a novel two-speed power transmission of the type referred to that will selectively transmit power to an associated device as a direct drive or with substantial speed reduction for moving relatively heavy loads including those loads occurring when the associated device is at rest and being adapted for easy shifting by automatic or manual means to either operating condition. Although not limited thereto, the present transmission has particular utility in the operation of closure members such as gate valves and the like where exceedingly high initial operating forces are required. Included in this object is the provision of such a transmission that is self-resettable to a low-speed, high-torque transmitting position.

A further object is to provide such a transmission with a novel safety mechanism for disconnecting the transmission torque from the output at predetermined overloads.

A still further object of the present invention is the provision of a two-speed power transmission that will accomplish the above objects while possessing a rugged and relatively compact and simple construction that will operate effectively over long periods of use.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Fig. 1 is a cross-sectional elevational view of a two-speed transmission constructed in accordance with the present invention and shown with a portion of the output shaft broken away;

FIG. 2 is a cross-sectional view of the transmission taken generally along lines 2—2 of FIG. 1;

FIG. 3 is a fragmentary perspective view of a clutch utilized in the transmission of the present invention; and FIG. 4 is a second embodiment of a safety mechanism included in the present invention.

Referring to the drawings in detail, a power transmission embodying the present invention is shown as including a casing, generally designated 2, which is supported by base legs 3 and comprises a front casing section 4 and a rear casing section 6 secured together through means of bolts 5 (one shown) and the attachment lugs 10 provided on the rear casing section. As shown in FIG. 1, there is located, in the front casing section, an input shaft 14 connected to a suitable power source 16, and a worm 18 mounted on the input shaft 14 for movement therewith.

Referring to FIG. 1, a tubular output shaft 20 having an open forward end (the left-hand end as viewed in FIG. 1) is mounted for rotational movement in the casing and extends longitudinally therethrough with its rear end 21 projecting beyond the casing for connection to an associated device to be powered by source 16 (the output shaft 20 being broken away and the associated device being omitted in the drawings). In order to reduce friction and wear, the front end of the output shaft 20 is mounted in suitable ball bearings 24 provided in a recessed boss 26 in the casing section 4 while the rearward end of the output shaft is mounted in a bushing 28 provided in bore 29, which extends through casing section 6. Suitable annular seals 30, 31 are provided around the output shaft 20 at each end of the casing for precluding the entry of dirt and like matter into the casing. As shown in FIG. 1, elongated slots 33, 34 are provided in the output shaft 20 adjacent each end thereof, for a purpose to be subsequently described in greater detail.

Transmission of power from the power source 16 to the output shaft 20, accompanied by speed reduction to one of two selectable speeds, is accomplished through means including planetary gearing which includes a sleeve 36 having external gear teeth 37 forming a sun pinion, the sleeve being mounted for rotational movement on the output shaft 20. The sleeve 36 is rotated by a worm gear 38 suitably keyed to the front end thereof and having its teeth in meshing engagement with the worm 18. The planetary gearing further includes an internal ring gear 42 mounted in a recess 44 provided in the rear casing section and held therein by a retaining ring 46. Three equi-angularly spaced planet gears 47 each disposed with their teeth 48 in meshing engagement with the teeth 37 of the sun pinion and the teeth 43 of the internal ring gear 42 are rotatably supported by stub shafts 49 on a rotatable plate 50. In normal operation, the internal ring gear is fixed against rotation, as will be hereinafter described, and the planet gears 47 are adapted to revolve around the sun pinion 36 in planetary fashion. The planetary motion of the planet gears 47 is transmitted to the plate 50 which has its hub 51 mounted for rotation on the output shaft 20.

Referring to FIG. 1, in order to establish a first drive connection directly between the sleeve 36 and the output shaft 20 and a second, lower speed and higher torque transmitting drive connection between the plate 50 and the output shaft 20, a pair of dog-type clutches are provided. One clutch includes a pin 52 fixed to and projecting from a piston 53, located rearwardly in the output shaft 20. The pin 52 extends through the slots 34 of the output shaft and is engageable with the walls of slots 34 and with projections 54 provided on the hub 51 of plate 50 to establish a drive connection. The other clutch similarly includes a pin 55 fixed to and projecting from a cylindrical guide 56 located forwardly in the output shaft 20. The pin 55 extends through slots 33 of the output shaft and is engageable with the walls of slots 33 and with projections 57 provided on the front end of sleeve 36 to establish a second drive connection. The piston 53 and guide 56 are adjustably connected for movement together as a shift unit by a shift rod 58 located in the output shaft and threadably secured at each end to the piston 53 and guide 56, respectively. The shift rod 58 together with piston 53 and guide 56 are adapted to be moved longitudinally to the right, as viewed in the drawings, by a suitable one-way actuator 59 provided at the front of the casing which actuator may be of the manual or automatic type. The clutch pins 52, 55 are spaced along the shift rod 58 such that engagement of one clutch is accompanied by disengagement of the other clutch and both clutches may be disengaged at the same time to provide a neutral position.

As shown in FIG. 1, a compression spring 60 is provided in the rear end of the output shaft 20 with one end bearing against the piston 53 of shift rod 58 and the other end bearing against a retaining ring 61 fixed in an annular groove 62 provided in the internal wall of the output shaft. The spring 60 biases the shift rod 58 to the position shown in FIG. 1 thus providing an automatic reset means that will cause engagement of clutch pin 52 as shown in FIG. 1 when the actuator 59 is released or de-energized.

In operation, when it is desired to transmit power for moving a heavy load, existing when the transmission and actuator are in "off" position, the shift rod 58 is maintained in its reset position wherein clutch pin 52 is engaged and clutch pin 55 is disengaged and power from source 16 is thus transmitted successively through the worm 18, worm gear 38, sun pinion 36, causing the planet gears 47 to revolve around the sun pinion 36 since the internal ring gear 42 is held fixed in the casing as will be subsequently described. Continuing, the power is then transmitted through the plate 50, which rotates with the planet gears 47, to the output shaft 20 by means of the engaged clutch pin 52 which causes the output shaft 20 to rotate with increased torque and reduced speed capable of moving heavy loads.

When it is desired to shift out of the above-described high-torque, low-speed, transmitting position, such as is desirable when the load of the associated device is lesser or has been lessened after initial movement thereof as described above, the actuator 59 is energized to move the shift rod 58 against the biasing force of spring 60 into a position wherein clutch pin 52 is disengaged and clutch pin 55 is engaged. In this shifted position the power from source 16 is transmitted through the worm 18, worm gear 38 to the sleeve 36 and finally to the output shaft 20 through clutch pin 55 whereby the torque and speed transmitted to the output shaft 20 will be lesser and greater, respectively, than that transmitted when the clutch pin 52 is engaged as described above. However, in both positions of the shift rod, the speed of output shaft 20 will be reduced when compared with that of the worm 18.

In order to place the output shaft 20 in the neutral position wherein no power is transmitted thereto, the shift rod 58 is moved by actuator 59 to a position wherein both clutches are disengaged, thereby disconnecting the output shaft 20 from the power source 16.

The ratio of speed reduction and torque increase for a given worm gear speed, when the transmission is in the high torque transmitting position will be governed by the ratio of teeth number between one planet gear 47 and the sun pinion 36. In the shown embodiment this ratio is one which results in a reduced speed equal to one-fourth of the worm gear speed. However, it will be understood that this ratio may be varied as desired without departing from the scope of the invention.

The internal ring gear 42 is fixed against rotation during normal operation of the transmission by means of a safety release mechanism comprising a lever retaining member 63 keyed at one end to a rod 64 and having its other end extending through the casing and engaging the wall of an arcuate recess 66 formed in the outer surface of the internal ring gear 42. One end of rod 64 extends through a support block 68 fixed to the casing while the other end of the rod is fixed to a collar 70 by means of a shear pin 72 extending through the collar 70 and the rod 64. As shown in FIG. 1, a pair of oppositely acting torsion springs 74, 76 are provided around the rod 64 with their ends fixed to the block 68 and collar 70 for resiliently holding the latter against rotation. A control arm 78 for controlling a switch or a signal device (not shown) is provided on the collar 70.

When the transmission is in the low speed, high torque-transmitting position, occurring when clutch pin 52 is engaged, excessive loads will result in shearing of the pin 72 thereby causing the lever retaining member 63 to pivot out of the arcuate recess 66 in the internal ring gear 42, thus freeing the ring gear for rotation. The power transmitted to the planet gears 47 will thus be transmitted to the ring gear 42 to revolve the latter around the sun pinion 36 and the planet gears 47 will cease revolving around the sun pinion axis but merely will rotate on stub shafts 49 about their own axis which axis will remain fixed. This will cause cessation of rotation of the plate 50 which, in turn, will disconnect the power transmitted to the output shaft 20. The above-described shearing of the shear pin 72 will be accompanied by rotation of the rod 64 which will be effective to move the control arm 78 to actuate a power cutoff switch or a signal device (not shown in the drawings as desired. The resilient fixing of the collar 70 by the springs 74, 76 provides a cushioning means which permits the collar 70 to resiliently yield when the output load becomes excessive but not to the point of pin shearing. When such loads appear, the internal ring gear 42 will move to a slight extent thus causing the lever retaining member 63 to move with rod 64; however, the lever retaining member 63 will remain in arcuate slot 66 and will restrain the ring gear from further movement. This limited movement of retaining member 63 will be transmitted through rod 64 to slightly rotate the collar 70 and, consequently, the control arm 78 and such rotation of the control arm may be used to actuate a signal device.

Referring to FIG. 4, an alternate safety mechanism is shown as comprising a retaining pin 100 positioned in a boss 102 of the casing and having a tapered inner extremity 104 received in a tapered recess 105 provided on the outer circumferential surface of the internal ring gear 42, whereby the ring gear is fixed against rotation. A conventional shear pin 106 is provided through the boss 102 and retaining pin 100 which will shear when the load transmitted to retaining pin 100 by the internal ring gear reaches a predetermined point. Shearing of the shear pin 106 will free the internal ring gear for rotation, which, in turn, will disconnect the power transmitted to the output shaft in the manner described above.

As will be apparent to persons skilled in the art, various modifications and adaptations of the structure above described will become readily apparent without departure from the spirit scope of the invention, the scope of which is defined in the appended claims.

I claim:

1. A two-speed power transmission comprising in combination a tubular output shaft mounted for rotational movement and having a pair of slots through the walls at each end portion thereof, a sun pinion mounted for rotational movement on the output shaft, means including an input gear fixed to the sun pinion connecting one end of the sun pinion to an input drive, a plate mounted for rotational movement on the output shaft and having a hub rotatably receiving the output shaft, a fixed internal ring gear positioned around the sun pinion, a plurality of planet gears each in meshing engagement with the sun pinion and the internal ring gear and being connected to the plate for driving the palte, a shift rod mounted for rotational and longitudinal movement in the output shaft, said shift rod having connected thereto at each end thereof a pair of clutch members projecting through the slots in the output shaft and being engageable with the slot walls, said plate hub and sun pinion each having on one of their ends a pair of projections respectively engageable with said pair of clutch members for establishing a drive connection, said shift rod having a first position wherein the projections of the plate hub are engaged with one pair of clutch members while the projections of the sun pinion are disengaged from the other pair of clutch members, a second position wherein the projections of the sun pinion are engaged with the other pair of clutch members while the projections of the plate hub are disengaged from said one pair of clutch members, and a third position wherein the projections of the sun pinion and plate hub are both disengaged from the clutch members, and actuation means for effecting longitudinal movement of the shift rod into said positions thereof.

2. A two-speed power transmission comprising in combination a tubular output shaft mounted for rotational movement and having an aperture through the wall at each end portion thereof, a sun pinion mounted for rotational movement on the output shaft, means including an input gear fixed to the sun pinion connecting the sun pinion to an input drive, a plate having a hub rotatably receiving the output shaft thereby mounting the plate for rotatable movement on the output shaft, a fixed internal ring gear positioned around the sun pinion, a plurality of planet gears each in meshing engagement with the sun pinion and the internal ring gear and being connected to the plate for driving the plate, a shift rod mounted in the output shaft for rotational movement with the output shaft and for longitudinal movement relative to the output shaft, said shift rod having a pair of longitudinally spaced clutch members extending through the apertures in the output shaft and engageable with the walls of the output shaft to drive the same, a clutch member on one end of the hub of the plate and on one end of the sun pinion respectively engageable with the clutch members of the shift rod, said shift rod having a first longitudinal position wherein the clutch member on the hub plate is engaged with its respective clutch member on the shift rod and the clutch member on the sun pinion is disengaged from its respective clutch member on the shift rod and a second longitudinal position wherein the clutch member on the sun pinion is engaged with its respective clutch member on the shift rod and the clutch member on the plate hub is disengaged from its respective clutch member on the shift rod, and means for longitudinally moving the shift rod to said first and second positions thereof.

3. A two-speed power transmission comprising in combination a tubular output shaft mounted for rotational movement and having an aperture through the wall at each end portion thereof, a sleeve mounted for rotational movement directly on the output shaft and having a sun pinion formed on its periphery generally at one end thereof, an input gear fixed to the periphery of the sleeve generally at the other end thereof for connecting the sleeve to an input drive, a plate located adjacent said one end of the sleeve and having a hub rotatably receiving the output shaft thereby mounting the plate for rotatable movement on the output shaft, a fixed internal ring gear positioned around the sun pinion, a plurality of spaced planet gears each in meshing engagement with the sun pinion and the internal ring gear, means connecting the planet gears to the plate for driving the plate, a shift rod mounted in the output shaft for rotation together with the output shaft and for longitudinal movement relative to the output shaft, said shift rod having a pair of longitudinally spaced clutch members extending through the apertures in the output shaft and engageable with the walls of the output shaft to drive the same, a clutch member formed on one end of the hub of the plate and on said other end of the sleeve respectively engageable with the clutch members of the shift rod, said clutch members on the shift rod being spaced so that in a first longitudinal position of the shift rod only the clutch member on the hub of the plate is engaged and in a second position of the shift rod only the clutch member on the sleeve is engaged, a spring means in the output shaft biasing the shift rod into one of said first and second positions, and an atcuating means for longitudinally moving the shift rod against the bias of said spring into the other of said positions.

References Cited in the file of this patent
UNITED STATES PATENTS

| | | |
|---|---|---|
| 865,556 | Andersen | Sept. 10, 1907 |
| 1,218,236 | Backscheider | Mar. 6, 1917 |
| 1,277,011 | Whelpley et al. | Aug. 27, 1918 |
| 2,033,749 | Walter | Mar. 10, 1936 |
| 2,132,951 | Hall | Oct. 11, 1938 |
| 2,222,716 | Mageoch | Nov. 26, 1940 |
| 2,382,110 | Sheldrick et al. | Aug. 14, 1945 |
| 2,441,989 | Brown | May 25, 1948 |
| 2,734,400 | Andershock | Feb. 14, 1956 |